United States Patent [19]

Stansbury, Jr. et al.

[11] 4,173,282

[45] Nov. 6, 1979

[54] SPARE LAMP HOLDER

[75] Inventors: Benjamin H. Stansbury, Jr., Beverly Hills; Barry Fluster, Los Angeles, both of Calif.

[73] Assignee: AVSP, Inc., Los Angeles, Calif.

[21] Appl. No.: 938,813

[22] Filed: Sep. 1, 1978

[51] Int. Cl.² .................... B65D 77/04; B65D 77/26; B65D 85/42; F21V 19/04
[52] U.S. Cl. .................... 206/216; 206/418; 206/455; 206/579; 362/207; 353/119; 206/316
[58] Field of Search ............. 206/216, 455, 418, 303, 206/387, 454, 579; 362/207, 253; 353/119, 27; 220/23, 22

[56] References Cited

U.S. PATENT DOCUMENTS

| 2,224,742 | 12/1940 | Muldoon | 362/207 |
| 2,341,057 | 2/1944 | Muldoon | 362/207 |
| 3,601,249 | 8/1971 | Larsson | 206/387 |
| 3,848,982 | 11/1974 | Shoji et al. | 353/27 R |
| 4,110,820 | 8/1978 | Konoshima | 362/207 |

Primary Examiner—William T. Dixson, Jr.
Attorney, Agent, or Firm—Spensley, Horn & Lubitz

[57] ABSTRACT

A spare lamp holder for use in a slide tray is disclosed. The holder includes a lamp support member and a cover member. The lamp support member is configured to support a spare projector lamp. A cover member is configured to secure the lamp in the lamp support member. The assembly of the lamp support member, the lamp, and the cover member is disposed in the central cavity of a circular slide tray and held in place by the locking ring member of the slide tray.

10 Claims, 3 Drawing Figures

U.S. Patent
Nov. 6, 1979
4,173,282
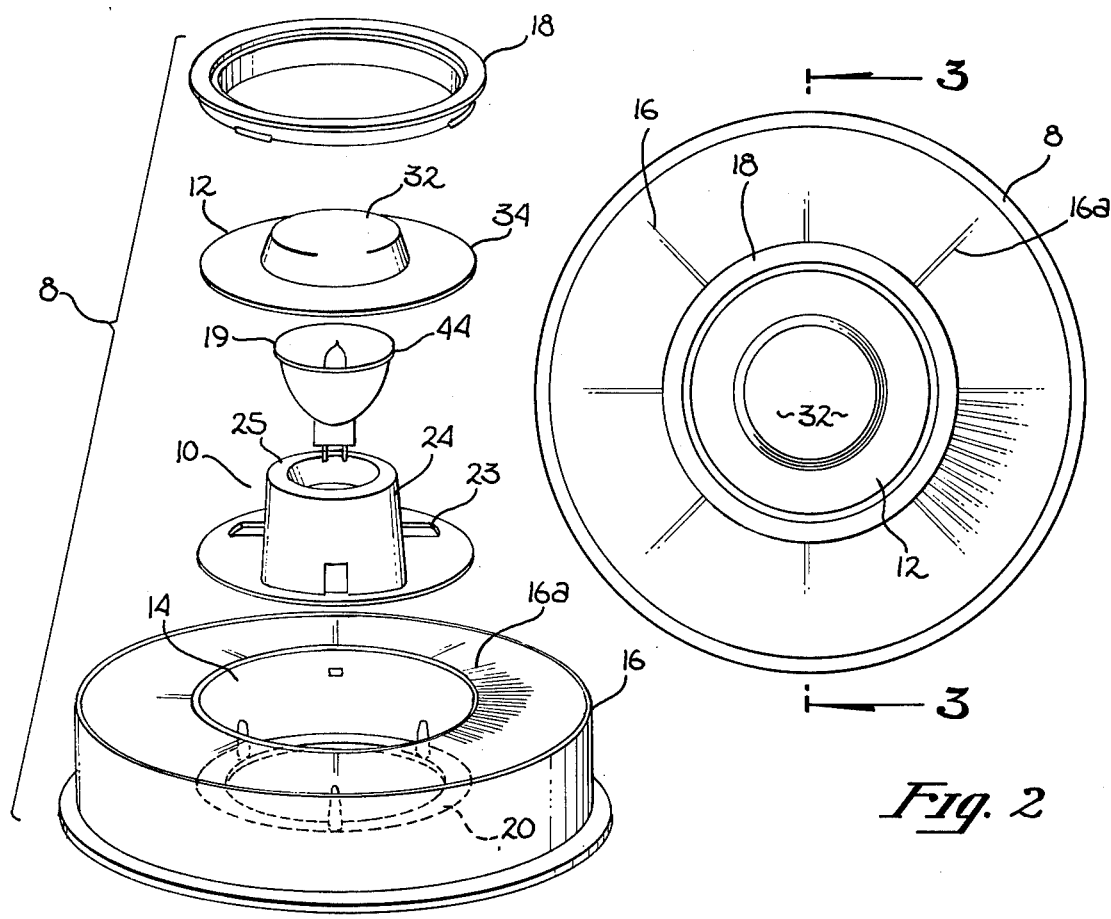
Fig. 1
Fig. 2
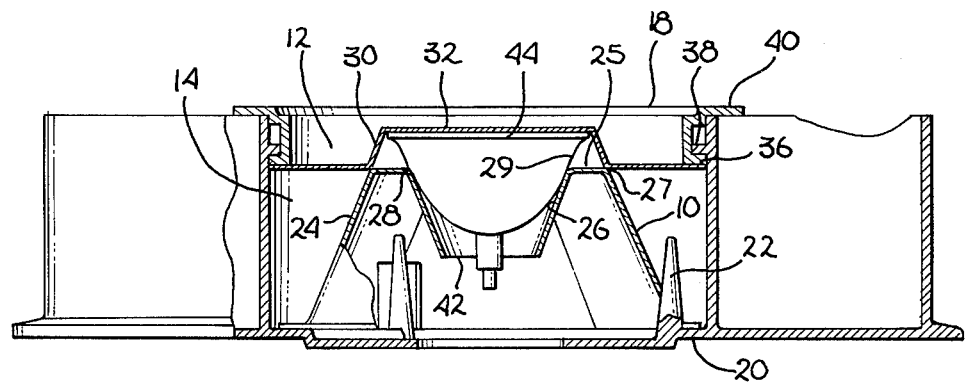
Fig. 3

SPARE LAMP HOLDER

BACKGROUND OF THE INVENTION

1. Field of the Invention

This invention relates to slide trays for storage of positive transparencies, and more particularly, to the design and construction of a spare lamp holder incorporated into such a slide tray.

2. Prior Art

It is believed that there are no viable devices in the prior art for storage of a spare projector lamp in the slide tray. For storage of spare lamps it is necessary to use space in the projector case, or to keep the spare lamp completely separate from the projector in a different location. This is at the least inconvenient, as the new lamp will not be readily available when the old lamp being used in the projector burns out. In addition the risk of breakage of the spare lamp exists. For example, without a safe storage compartment, the lamp may be permitted to come into contact with a variety of objects, including the projector in the projector case causing the lamp to break or the projector to be damaged.

The problem with the storage of such a lamp relates, at least in part, to the configuration of the lamp as well as of the fragile materials which must be used in its construction. Thus, the storage of the lamp must take these factors into consideration. As stated above, it is not to be believed that the prior art teaches a method for storing such a device.

There have been prior art devices which utilize the slide tray as the means for storing items used in conjunction with a slide presentation. A notable example of this is set forth in U.S. Pat. No. 3,601,249. The invention of that patent is a slide tray with a cover designed to effect a storage compartment for a reel of magnetic tape. Such a device, even if somehow modified, still fails to teach a storage compartment which can safely, securely and conveniently store a projector lamp. The present invention overcomes the problems of prior art designs and teaches a lamp holder which can easily be incorporated into a slide tray. The configuration of the lamp holder of the present invention safely and securely holds the lamp in the tray. In addition, access to the lamp is easily attained.

SUMMARY OF THE INVENTION

It is one object of this invention to provide a safe, convenient means for storage of a spare lamp in a slide tray for use with a slide projector. Storage of the spare lamp actually within the slide tray keeps the lamp conveniently at hand for use as a replacement for a burned out bulb. The lamp is also kept safe, protected from contact with other objects.

In general, the holder of the present invention includes a lamp support member disposed in the central cavity of a circular slide tray and a cover member. The lamp support member is generally conically shaped and configured to securely support the bowl of a spare lamp circumferentially on its upper edge. The cover member is configured to secure the lamp in the lamp support member by exerting pressure downward circumferentially about the upper rim of the bowl of the lamp. The cover member, in turn, is held down by pressure around its outer rim exerted by a locking ring member. The locking ring member can be rotated into a predetermined locking position where it is held in place by flanges which extend inwardly from the wall of the central cavity of the slide tray. Thus, the assembly of the lamp support member, the lamp, and the cover member is held in place in the central cavity of the slide tray between the base member and a locking ring member. This design securely holds the spare lamp in the central cavity of the slide tray readily available for use when needed.

When an old bulb burns out, access to the replacement bulb is easily attained. The locking ring member is rotated to disengage it from the flanges. The cover member is then lifted up and off from the bulb. The bulb can then be easily removed from its resting place in the lamp support member.

The novel features which are believed to be characteristic of the invention, both as to its organization and method of operation, together with further objectives and advantages thereof, will be better understood from the following description considered in connection with the accompanying drawings in which a presently preferred embodiment of the invention is illustrated by way of example. It is to be expressly understood, however, that the drawings are for the purpose of illustration and description only, and are not intended as a definition of the limits of the invention.

BRIEF DESCRIPTION OF THE DRAWINGS

FIG. 1 is an exploded view of the spare lamp holder device of the present invention as used in conjunction with a slide tray, a spare lamp and a locking ring;

FIG. 2 is an overhead view of the spare lamp holder device of the present invention disposed in the slide tray;

FIG. 3 is a cross-sectional view taken along lines 3—3 of FIG. 2 and showing the internal aspects of the spare lamp holder device of the present invention.

DETAILED DESCRIPTION OF THE INVENTION

1. The Device

Referring to FIGS. 1–3, one can see the spare lamp holder 8 of the present invention. The holder 8 comprises a lamp support member 10 and a cover member 12. The lamp support member 10 is disposed in the central cavity 14 of a slide tray 16 having a plurality of outwardly extending slide compartments 16a. Detailed description of slide tray 16 will not be presented herein as such slide trays are very well known in the art. The lamp support member 10 is configured to support a spare projector lamp 19, such lamps 19 are also well known in the art. The cover member 12 is configured to secure the lamp 19 in the lamp support member 10. The assembly of the lamp support member 10, the lamp 19, and the cover member 12 is secured in the central cavity 14 by locking ring member 18.

In the preferred embodiment, the lamp support member 10 has a frustro-conical shape. The base 21 of the lamp support member 10 rests on a base member 20 of the slide tray 16 in the central cavity 14. A plurality of upwardly extending members 22 extending from the base member 20 adjacent to the central cavity 14 selectively engage the lamp support member 10 by protruding through holes 23 in the base 21 of the lamp support member 10. In this manner the lamp support member 10 is positioned in the central cavity 14. Other means for positioning member 10 in the tray 16 are within the scope of the present invention. For example, pegs, keying slots and the like could also be used.

In the preferred embodiment, the lamp support member 10 has a conical central section 24 which is coaxially disposed within the circular central cavity 14. The conical section 24 of the lamp support member 10 has a flat horizontal upper surface 25. More specifically, the upper surface 25 of the lamp support member 10 depends inwardly to form a depending conical section 26. The junction of the horizontal upper surface 25 and the conical upwardly extending section 24 forms an upper outside edge 27 which is circular in shape. The junction of the horizontal upper surface 25 and the depending conical section 26 forms an upper inside edge 28 also circular in shape and coaxial with but of a smaller circumference than the upper outside edge 27.

The outer surface of a typical spare lamp 19 is generally bowl shaped. Two leads depend from the lamp 19 for joining the lamp 19 to the associated projector.

The cover member 12 is generally circular with two main flat surfaces. One surface, outer rim 34, outwardly extends so as to engage the wall of the central cavity 14. In the preferred embodiment, the inner circumference of the outer rim 34 is equal to the circumference formed by the upper outside edge 27 of the lamp support member 10. When disposed in the tray 16, the inside edge of the outer rim 34 is supported by the upper outside edge 27 of the lamp support member 10. The surface of the cover member 12 extends conically upward from the inside circumference of the outer rim 34. The surface of the cover member 12 then turns inward to form a flat, circular horizontal surface 32 at the center of the cover member 12. This inner surface 32 is configured so as to be coaxial with the lamp support member 10.

The locking ring member 18 is cylindrically shaped with an annular flange 40 extending outward from the top thereof. The annular flange 40 supports the locking ring member 18 about its circumference by resting on the wall of the central cavity 14 of the slide tray 16. Extending outwardly from the bottom of the locking ring member 18 are several flanges 36 located opposite similar flanges 38 which extend inwardly from the wall of the central cavity 14. The flanges 36 on the locking ring member 18 when the locking ring member 18 is in place are in a position directly beneath the flanges 38 on the wall of the central cavity 14 so that vertical movement of the locking ring member 18 is restricted by the contact between the flanges 36 and 38 and the contact between the annular flange 40 and the wall of the central cavity 14. The bottom surface of the flanges 36 on the locking ring member 18, when the locking ring member 18 is rotated into a predetermined position, are in contact with the outer rim 34 of the cover member 12 thus restricting vertical movement of the cover member 12 and securing it in position.

2. Operation of the Holder

In operating the holder 8 of the present invention, the lamp support member 10 is placed in position in the bottom of the central cavity 14. Its radial movement is restricted by pin-like upwardly extending members 22 which extend upward from the base member 20 of the slide tray 16 through holes 23 in the base 21 of the lamp support member 10. Next, the spare projector lamp is placed in the lamp support member 10 such that the bowl 29 of the lamp 19 faces upwards and the bottom of the lamp 19 extends down through the center hole 42 in the lamp support member 10. The outer edge of the bowl 29 of the lamp is supported by the upper inside edge 28 of the lamp support member 10. The cover member 12 is then placed over the lamp 19 and the lamp support member 10. The circular inner surface 32 of the cover member 12 rests on the circular flat rim 44 of the lamp 19. There is contact also between the upper outside edge 27 of the lamp support member 10 and the inside edge of the outer rim 34 of the cover member 12. This prevents the cover member 12 from being pushed down too far, putting undue pressure on the lamp 19. The positioning of the cover member 12 secures the bulb 19 in the lamp support member 10 thus preventing any vertical or lateral movement of the bulb 19.

Finally, the locking ring member 18 is placed on top of the cover member 12 with the bottom surface of flange 36 exerting pressure on the outer rim 34 of the cover member 12, thereby holding down the cover member 12 and preventing any vertical movement of the cover member 12, the bulb 19 or the lamp support member 10. The locking ring member 18 is then twisted radially about its vertical axis until the upper surface of each flange 36 on the locking ring member 18 engages with the bottom surface of each opposing flange 38 on the wall of the central cavity 14. This secures and prevents movement of the whole assembly.

To remove the lamp 19 from the tray 16, one need only rotate ring member 18 so as to disengage members 36 from member 38. The ring member 18 and cover member 12 can then be removed exposing lamp 19 for easy removal.

While a wide variety of materials, shapes and other configurations can be used in this invention, it should be understood that changes can be made without departing from the spirit or scope. For example, in the preferred embodiment all of the parts of the present invention are made out of plastic materials such as nylon, PVC, styrene acrylic resins or the like. Of course, other materials such as reinforced plastics are within the scope of the present invention. Further, the shape of the lamp 19, to some extent, dictates the shape of the lamp support member 10. Other lamp configurations are within the scope of the present invention, and thus, so too are other configurations for member 10. This invention, therefore, is not to be limited to the specific embodiments discussed and illustrated herein.

What is claimed is:

1. In a photographic slide tray for use with an associated slide projector, said tray having a plurality of outwardly extending slide compartments formed about a central cavity, the improvement which comprises a lamp support member disposed in said central cavity, said lamp support member having positioning means for securely holding a spare lamp for said projector.

2. The slide tray according to claim 1 where said lamp support member has a frustro-conical shape.

3. The slide tray according to claim 1 where said lamp support member includes means for attaching said lamp support member to said slide tray.

4. The slide tray according to claim 1 including a cover member disposed over said central cavity, said cover member configured to securely position said spare lamp between said cover and said lamp support member.

5. The slide tray according to claim 1 including upwardly extending members adjacent to said central cavity, said upwardly extending member selectively engaging said lamp support member so as to position said lamp support member in said cavity.

6. The slide tray according to claim 5 where said upwardly extending members are pin-like members which extend into associated openings in said lamp support member.

7. A generally circular photographic slide tray for use with an associated slide projector, said tray having a plurality of outwardly extending slide compartments formed above a central cavity, said cavity formed by a base member and an upwardly extending circular wall member, a lamp support member axially disposed in said cavity on said base member, said lamp support member forming an inwardly extending positioning member adjacent the top thereof for holding a spare lamp for said slide projector, a generally circular cover member disposed in said central cavity over said lamp support member such that a spare lamp can be positioned therein between, and a locking member disposed over said cover member and selectively engaging said side member, said locking member selectively retaining said cover member in said cavity.

8. The slide tray according to claim 7 where said lamp support member has a frustro-conical shape.

9. The slide tray according to claim 7 including upwardly extending members adjacent to said central cavity, said upwardly extending members selectively engaging said lamp support member so as to position said lamp support member in said cavity.

10. The slide tray according to claim 7 where said cover includes means for engaging said spare lamp.

* * * * *